(12) United States Patent
Grzywacz et al.

(10) Patent No.: US 7,109,616 B2
(45) Date of Patent: Sep. 19, 2006

(54) ELECTRIC MOTOR WITH HALL EFFECT MEMORY MODULE

(75) Inventors: Keith E Grzywacz, Lansing, MI (US); Steven D Searles, Marshall, MI (US)

(73) Assignee: Fasco Industries, Inc., Eaton Rapids, MI (US)

( * ) Notice: Subject to any disclaimer, the term of this patent is extended or adjusted under 35 U.S.C. 154(b) by 184 days.

(21) Appl. No.: 10/687,293

(22) Filed: Oct. 16, 2003

(65) Prior Publication Data

US 2005/0082926 A1 Apr. 21, 2005

(51) Int. Cl.
*H02K 5/00* (2006.01)
*H02K 11/00* (2006.01)

(52) U.S. Cl. ..................... 310/68 B; 310/89
(58) Field of Classification Search .............. 310/68 B, 310/68 R, 71, 89, 88, 90; 324/207.2
See application file for complete search history.

(56) References Cited

U.S. PATENT DOCUMENTS

| | | | | | |
|---|---|---|---|---|---|
| 3,894,232 | A | * | 7/1975 | Laspesa ................. | 250/231.13 |
| 4,759,218 | A | * | 7/1988 | Rodi et al. .................. | 324/175 |
| 5,235,228 | A | * | 8/1993 | Nakanura et al. ............. | 310/51 |
| 5,272,402 | A | * | 12/1993 | Blaser et al. ............. | 310/68 B |
| 5,877,572 | A | * | 3/1999 | Michaels et al. ........... | 310/179 |
| 5,977,671 | A | * | 11/1999 | Kim ............................. | 310/89 |
| 6,424,061 | B1 | * | 7/2002 | Fukuda et al. ............ | 310/49 R |

FOREIGN PATENT DOCUMENTS

| | | | |
|---|---|---|---|
| JP | 06-105521 | * | 9/1992 |
| JP | 6-284641 | * | 10/1994 |
| JP | 07-274443 | * | 10/1995 |

OTHER PUBLICATIONS

Machine Translation of Kidokoro, jp 07-274443, Oct. 20, 1995.*

* cited by examiner

*Primary Examiner*—Karl Tamai
(74) *Attorney, Agent, or Firm*—Baker & Daniels

(57) ABSTRACT

An electric motor with a Hall effect module. An endframe is attached to a motor housing to enclose one end of the motor housing. A cover is snap-fit onto the endframe externally of the motor housing, wherein resilient fingers on the endframe engage an arrangement of lugs and/or recesses on the cover. A one-piece magnet/carrier assembly and an electronic sensor are captured between the cover and the endframe to provide a Hall effect sensing feature. Optionally, the cover may be attached to the endframe without the magnet/carrier assembly and the electronic sensor when the Hall effect sensing feature is not desired. The endframe additionally includes rigid walls disposed about the resilient fingers which aid in locating and guiding the cover onto the endframe and into engagement with the resilient fingers. After the cover is attached to the endframe, the walls protect the resilient fingers and abut the outside surface of the cover, providing a robust connection between the cover and endframe and preventing disengagement of the cover from the endframe.

11 Claims, 8 Drawing Sheets

FIG_3
PRIOR ART

FIG._4
PRIOR ART

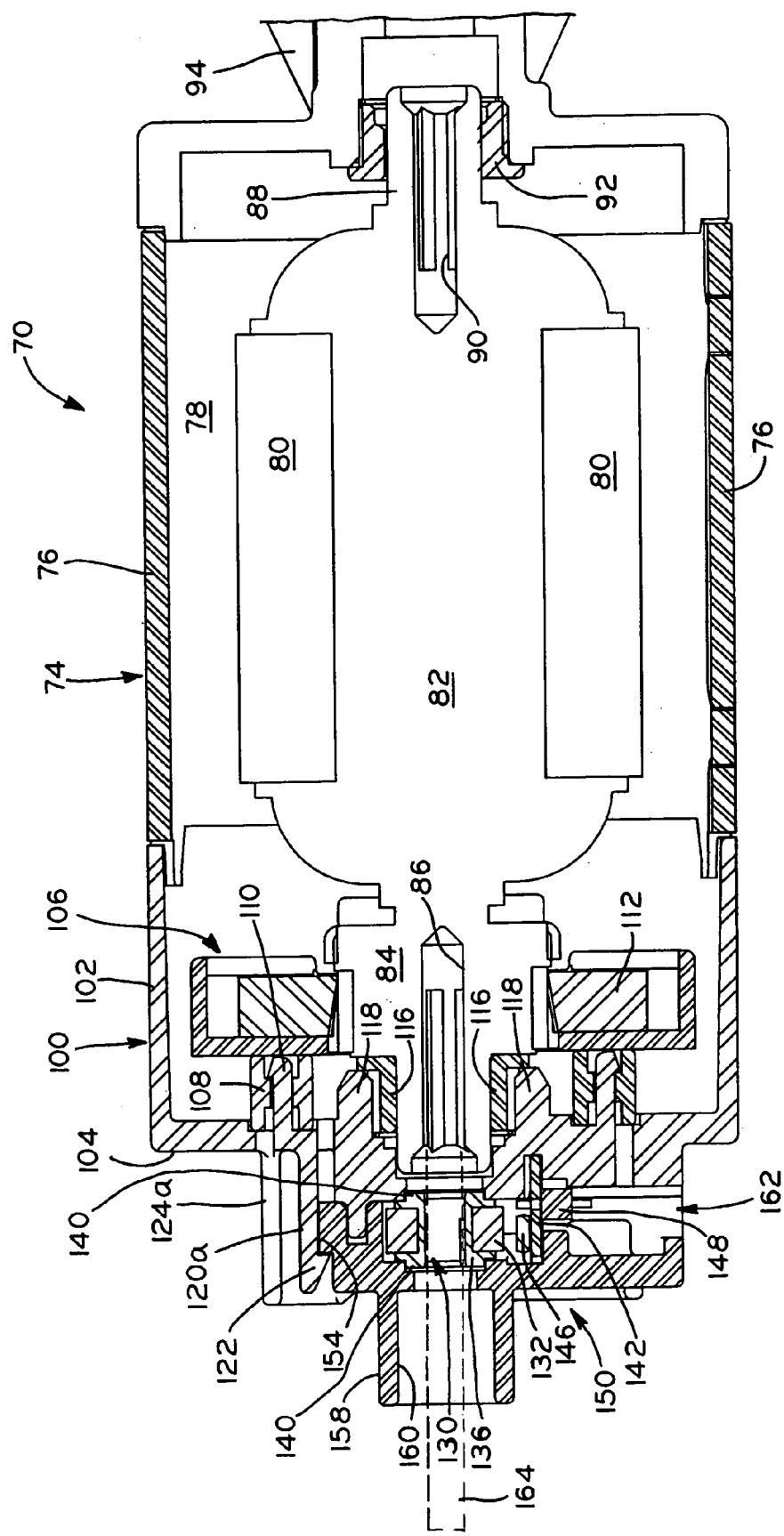
FIG_8

ELECTRIC MOTOR WITH HALL EFFECT MEMORY MODULE

1. Field of the Invention

The present invention relates to electric motors, such as small DC electric motors which may be used in combination with Hall effect sensing devices for sensing the position of the armatures of the motors.

2. Description of the Related Art

Electric motors, such as small 12 volt DC electric motors, for example, are used in many applications in combination with Hall effect sensing devices for sensing the position of the armatures of the electric motors. In automobile power adjustable seats, for example, one or more small electric motors are used to drive mechanical adjustment structure through flexible cables and screw shafts to adjust the position of the seat. When a "memory" feature is desired for the seat, such as for moving the seat from a non-adjusted position to one or more desired preset adjusted positions, a Hall effect sensing device is used with the motor to sense the rotational position of the motor armature. Based upon the sensed positions of the motor armature, a control device operates the motor to move the seat from a non-adjusted position to one or more desired adjusted positions.

A known electric motor which includes a Hall effect sensor is shown in FIGS. 1–4. Motor 10 generally includes motor housing 12 having power connector 14 for supplying input power to motor 10. As shown in FIG. 4, motor housing 12 includes stator 16, and rotor 18 with armature 20. End portion 22 of armature 20 includes hole 24 (FIGS. 2 and 3), typically a square broached hole, for receipt of a drive pin or the end of a flexible cable (not shown), such that the drive pin or flexible cable is rotationally driven by motor 10. Motor 10 additionally includes end plate 26, which is attached to and encloses one end of motor housing 12. End plate 26 includes annular ridge 28 which defines an opening in end plate 26 aligned with armature 20. A Hall effect assembly 30 is attached to end plate 26 of motor 10 as described below, and generally includes ferrule 32, bearing 34 (FIG. 4), printed circuit board ("PCB") assembly 36, magnet 38, magnet carrier 40, and cover 42.

To assemble motor 10, stator 16, rotor 18, armature 20, and other internal components of motor 10 are assembled within motor housing 12 in a suitable manner. Thereafter, flexible fingers 44 at first end 46 of ferrule 32 are inserted into the opening of end plate 26 which is defined by annular ridge 28, and bearing 34 is press-fit into first end 46 of ferrule 32. Press-fitting bearing 34 into first end 46 of ferrule 32 spreads flexible fingers 44 of ferrule 32 into tight engagement with annular ridge 28 of end plate 26 to secure ferrule 32 to end plate 26. Thereafter, end plate 26 is attached to the open end of motor housing 12 in a suitable manner, with end portion 22 of armature 20 rotatably supported within bearing 34.

PCB assembly 36 is then inserted into cavity 48, which is defined within second end 50 of ferrule 32. Square body portion 52 of magnet carrier 40 is inserted into square hole 54 of magnet 38, such as with a snap-fit connection, and magnet 38 and magnet carrier 40 are then placed within the circular portion of cavity 48 in second end 50 of ferrule 32 such that magnet 38 and magnet carrier 40 are aligned with armature 20, and outer surface 55 of magnet 38 is disposed closely adjacent PCB assembly 36. Cover 42 is then attached to ferrule 32 by press-fitting a series of pins 58 of cover 42 into corresponding aligned apertures 60 of ferrule 32. A drive pin or the end of a flexible cable (not shown) may be inserted sequentially through opening 62 in cover 42, the opening in magnet carrier 40, and into square hole 24 of armature 20. An electrical input/output connector (not shown) is attached to receptacle 64 of cover 42 in electrical communication with PCB assembly 36.

Although the foregoing motor 10 and Hall effect assembly 30 are reliable and have functioned well, the Hall effect assembly 30 requires a relatively large number of individual parts, including the ferrule 32, bearing 34, PCB assembly 36, magnet 38, magnet carrier 40, and cover 42. Further, manufacture of motor 10 and Hall effect assembly 30 requires a large number of individual assembly steps. In particular, the press-fit connection between the bearing 34, ferrule 32, and end plate 26 is rather cumbersome, and increases the difficulty of manufacture of motor 10 and Hall effect assembly 30. Further, because ferrule 32 contains bearing 34 for supporting motor armature 20, ferrule 32 is an integral part of motor 10 which must be used even in applications in which a Hall effect sensing feature is not needed for motor 10.

What is needed is an electric motor with a Hall effect assembly which is an improvement over the foregoing.

SUMMARY OF THE INVENTION

The present invention provides an electric motor with a Hall effect module. An endframe is attached to the motor housing to enclose one end of the motor housing. A cover is snap-fit onto the endframe externally of the motor housing, wherein resilient fingers on the endframe engage an arrangement of lugs and/or recesses on the cover. A one-piece magnet/carrier assembly and an electronic sensor are captured between the cover and the endframe to provide a Hall effect sensing feature. Optionally, the cover may be attached to the endframe without the magnet/carrier assembly and the electronic sensor when the Hall effect sensing feature is not desired. The endframe additionally includes rigid walls disposed about the resilient fingers which aid in locating and guiding the cover onto the endframe and into engagement with the resilient fingers. After the cover is attached to the endframe, the walls protect the resilient fingers and abut the outside surface of the cover, providing a robust connection between the cover and the endframe and preventing disengagement of the cover from the endframe.

The motor armature, endframe, magnet/carrier assembly, and cover each include axially aligned holes and/or openings, such that a drive pin or the end of a flexible cable, for example, may be inserted sequentially through the cover opening, magnet/carrier assembly hole, endframe opening, and into the armature hole to drivingly couple the drive pin or flexible cable end to the motor.

Advantageously, the present motor and Hall effect module includes a reduced number of total parts as compared with prior designs. The endframe integrates the end plate and ferrule components of the known motor shown in FIGS. 1–4 into a single component, which fully encloses the end of the motor housing, supports the armature bearing internally of the motor housing, and includes attachment structure for attaching the cover to the endframe. The magnet/carrier assembly includes a one-piece magnet body and a plastic carrier portion which is injection molded around the magnet body, thus obviating the need for a separate magnet and magnet carrier, as in the known motor shown in FIGS. 1–4.

In the present motor and Hall effect module, the Hall effect components, such as the magnet/carrier assembly and the electronic sensor, are modular components which are housed externally of the motor. Therefore, when a Hall effect sensing feature is needed, the magnet/carrier assembly and electronic sensor are included, and when a Hall effect sensing feature is not needed, the cover is attached to the endframe without the magnet/carrier assembly and the electronic sensor.

The snap-fit connection between the cover and the endframe greatly reduces the difficulty of assembly of the motor and Hall effect module. Advantageously, as the cover is attached to the endframe, the rigid walls of the endframe aid in properly locating and guiding the cover onto the endframe and into engagement with the resilient fingers of the endframe. After the cover is attached to the endframe, the walls abut the outer surface of the cover to provide a rigid, robust connection between the cover and the endframe. Further, after the cover is attached to the endframe, the walls also protect the resilient fingers from external contact, and prevent movement or disengagement of the cover from the endframe.

In one form thereof, the present invention provides an electric motor, including a motor housing containing a stator, rotor, and armature assembly; an endframe attached to the motor housing, the endframe including at least one first attachment component, and an opening aligned with the armature; and a cover including at least one second attachment component, each second attachment component in engagement with a respective first attachment component to attach the cover to the endframe; and one of a magnet receiver and a Hall effect sensor receiver disposed within at least one of the endframe and the cover.

In another form thereof, the present invention provides an electric motor, including a motor housing containing a stator, rotor, and armature assembly; an endframe attached to the motor housing, the endframe including an opening aligned with the armature; a cover attached to the endframe, the cover and the endframe defining a cavity therebetween; and means for attaching the cover to the endframe.

In a further form thereof, the present invention provides an electric motor, including a motor housing containing a stator, rotor, and armature assembly; an endframe attached to an open end of the motor housing, the endframe including an opening aligned with the armature; a cover attached to the endframe, the cover and the endframe defining a cavity therebetween; a magnet disposed within the cavity, the magnet aligned with the endframe opening; and a Hall effect sensor captured between the endframe and the cover, the Hall effect sensor disposed proximate the magnet.

In a further form thereof, the present invention provides an electric motor, including a motor housing containing a stator, rotor, and armature assembly; an endframe attached to the motor housing, the endframe including an opening aligned with the armature; a cover snap-fit to the endframe, the cover and the endframe defining a cavity therebetween; a magnet and a Hall effect sensor each disposed within the cavity, the magnet aligned with the endframe opening, and the Hall effect sensor disposed proximate the magnet.

In a further form thereof, the present invention provides an electric motor, including a motor housing containing a stator, rotor, and armature assembly; an endframe attached to an open end of the motor housing, the endframe including an opening aligned with the armature, a pluralilty of resilient fingers extending from the endframe, and a plurality of walls extending from the endframe, each the wall at least partially surrounding a respective the finger; a cover attached to the endframe, the cover including engagement structure engaged by the resilient fingers, the endframe and the cover defining a cavity therebetween; a magnet and a Hall effect sensor each disposed within the cavity, the magnet aligned with the endframe opening, and the Hall effect sensor disposed proximate the magnet.

In a further form thereof, the present invention provides a method for assembling an electric motor, including the steps of mounting an endframe to a motor housing to substantially enclose a stator, rotor and armature assembly within the motor housing, the endframe including an opening aligned with the armature; and attaching a cover to the endframe by a snap-fit engagement to define a cavity between the cover and the endframe.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 8 is a sectional view taken along line 8—8 of FIG. 7.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 1:
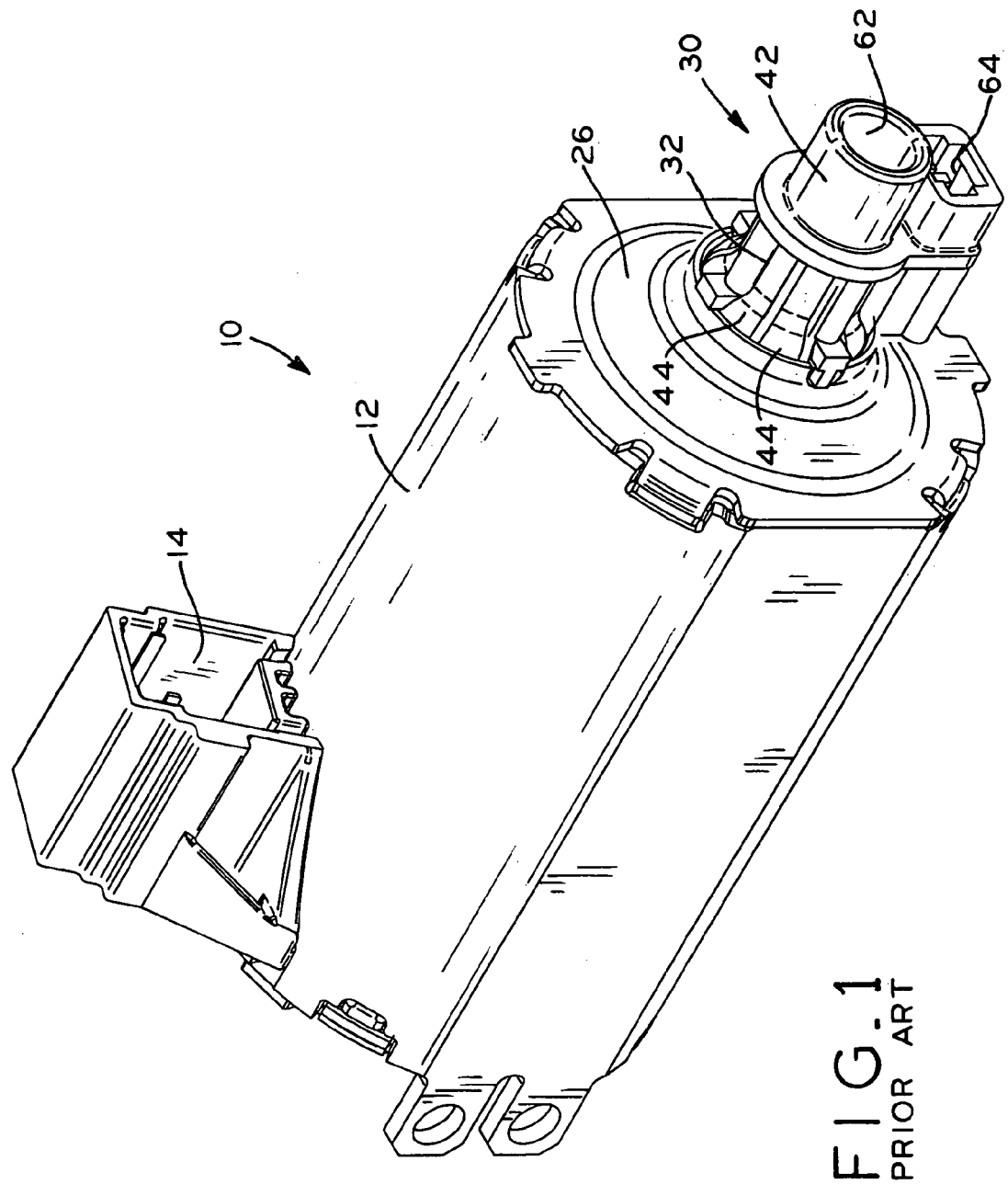
FIG. 1 is a perspective view of a known electric motor with a Hall effect assembly.
Figure 2:
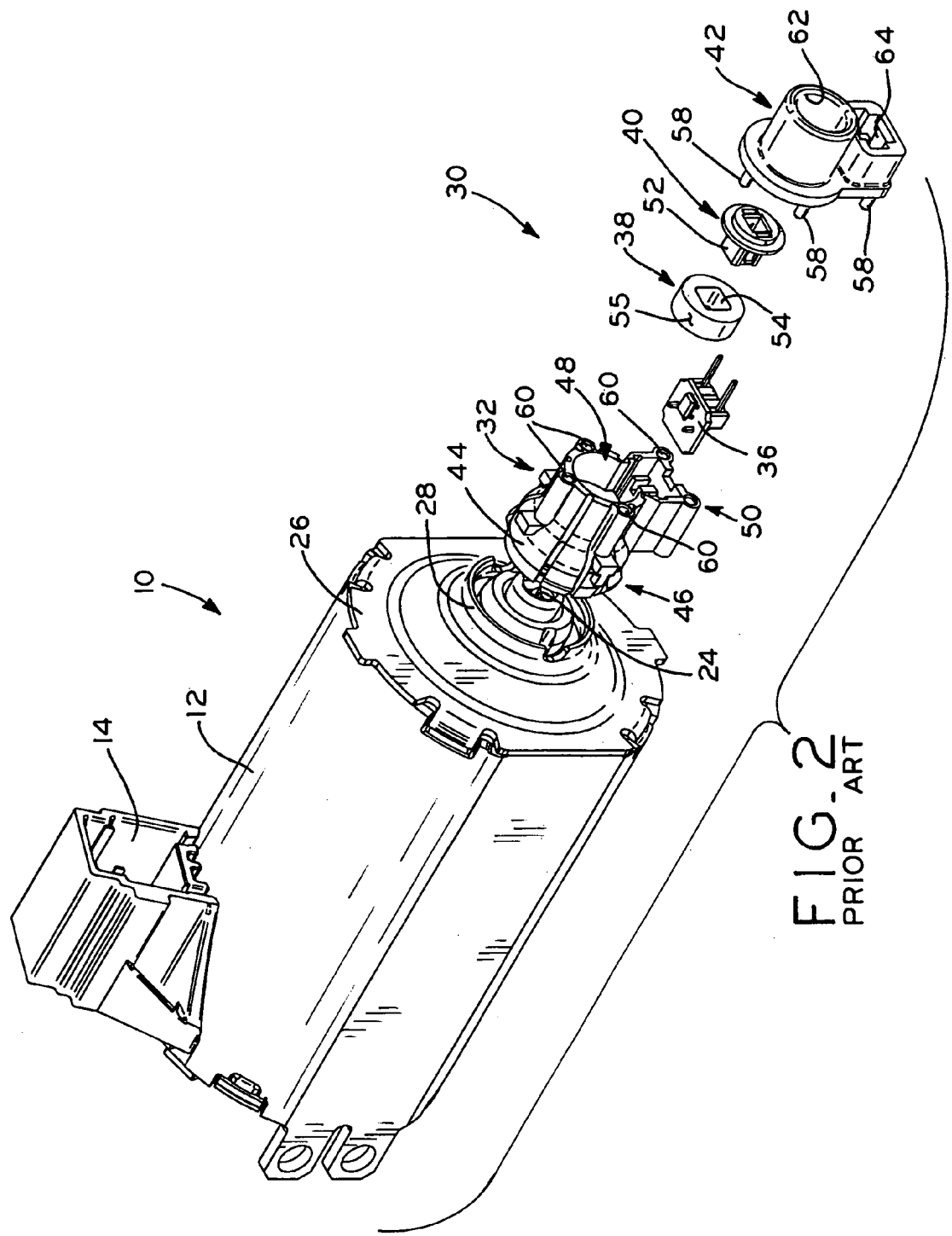
FIG. 2 is an exploded view of the Hall effect assembly of the motor of FIG. 1, showing the ferrule, PCB assembly, magnet, magnet carrier, and cover.
Figure 3:
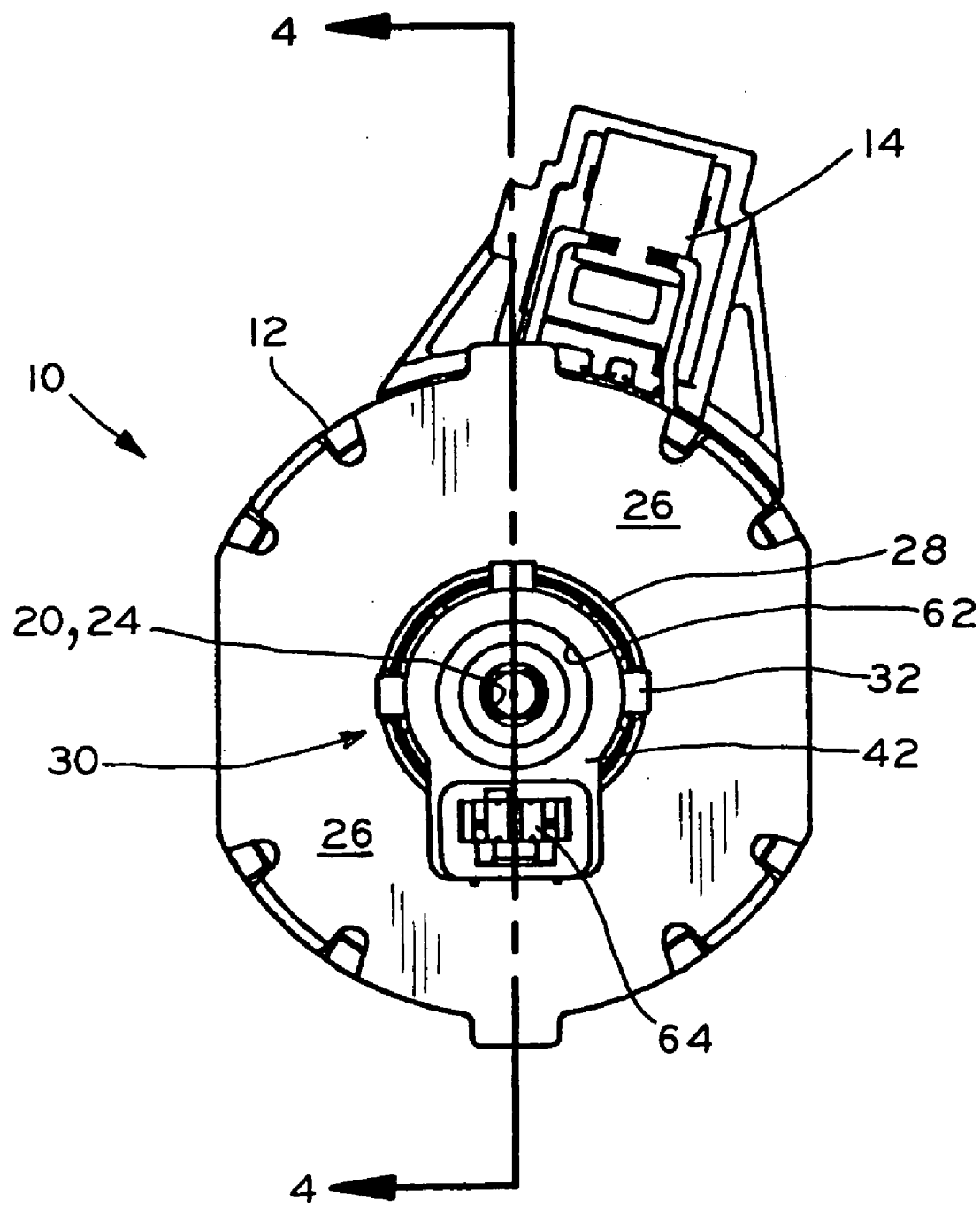
FIG. 3 is an end view of the motor and Hall effect assembly of FIG. 1.
Figure 4:
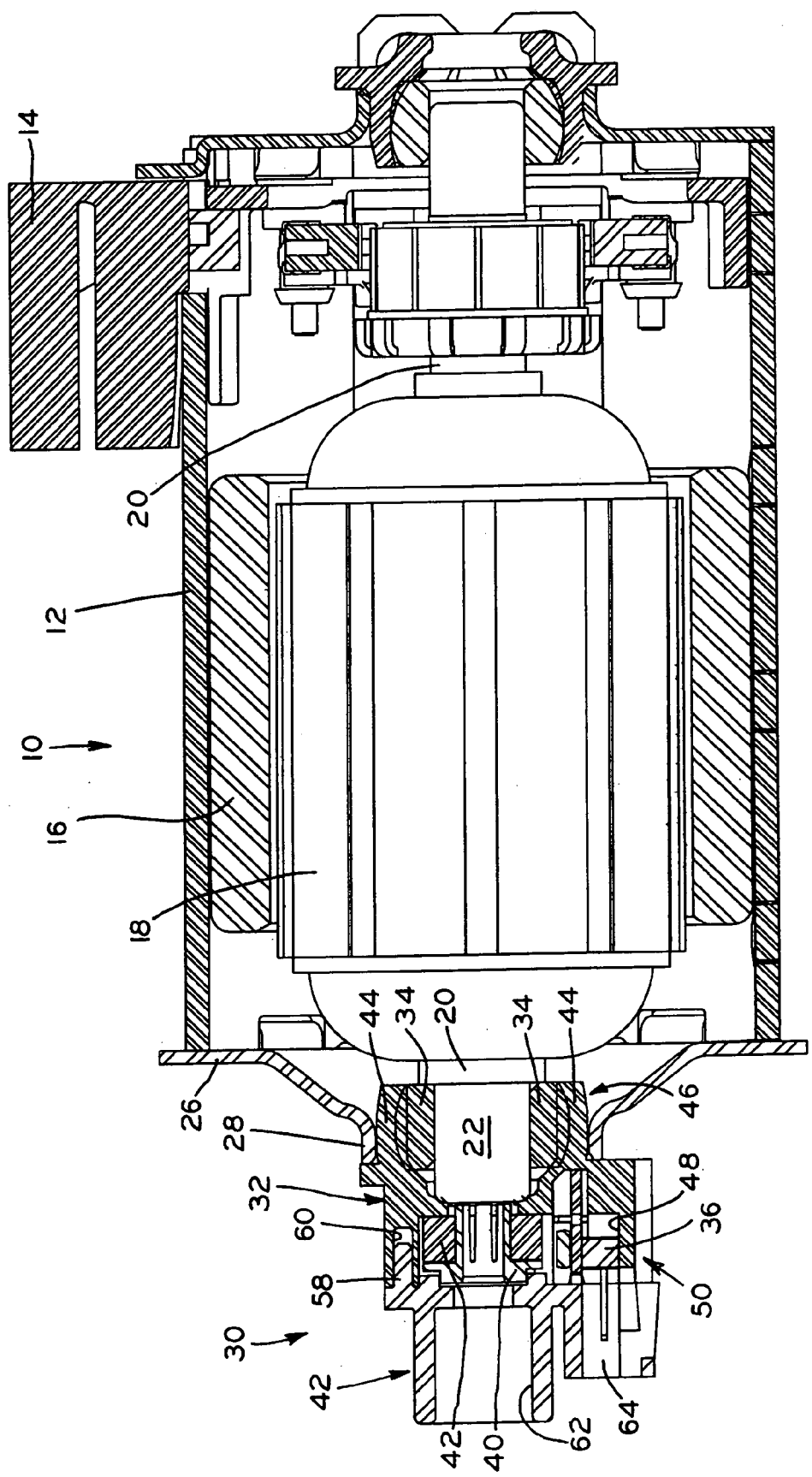
FIG. 4 is a sectional view taken along line 4—4 of FIG. 3.

Referring to FIGS. 5–8, motor assembly 70 with Hall effect module 72 are shown according to the present invention. Motor assembly 70 generally includes 12 volt DC electric motor 74 which, as shown in FIG. 8, includes motor housing 76 containing stator 78, rotor 80, and armature 82. Although Hall effect module 72 is shown and described herein associated with12volt DC motor 74, Hall effect module 72 may be used with other types of electric motors. Armature 82 includes first end portion 84 with hole 86 and second end portion 88 with hole 90. Holes 86 and 90 may have a square or other polygonal internal shape typically formed by a broaching operation, for example.

Figure 5:
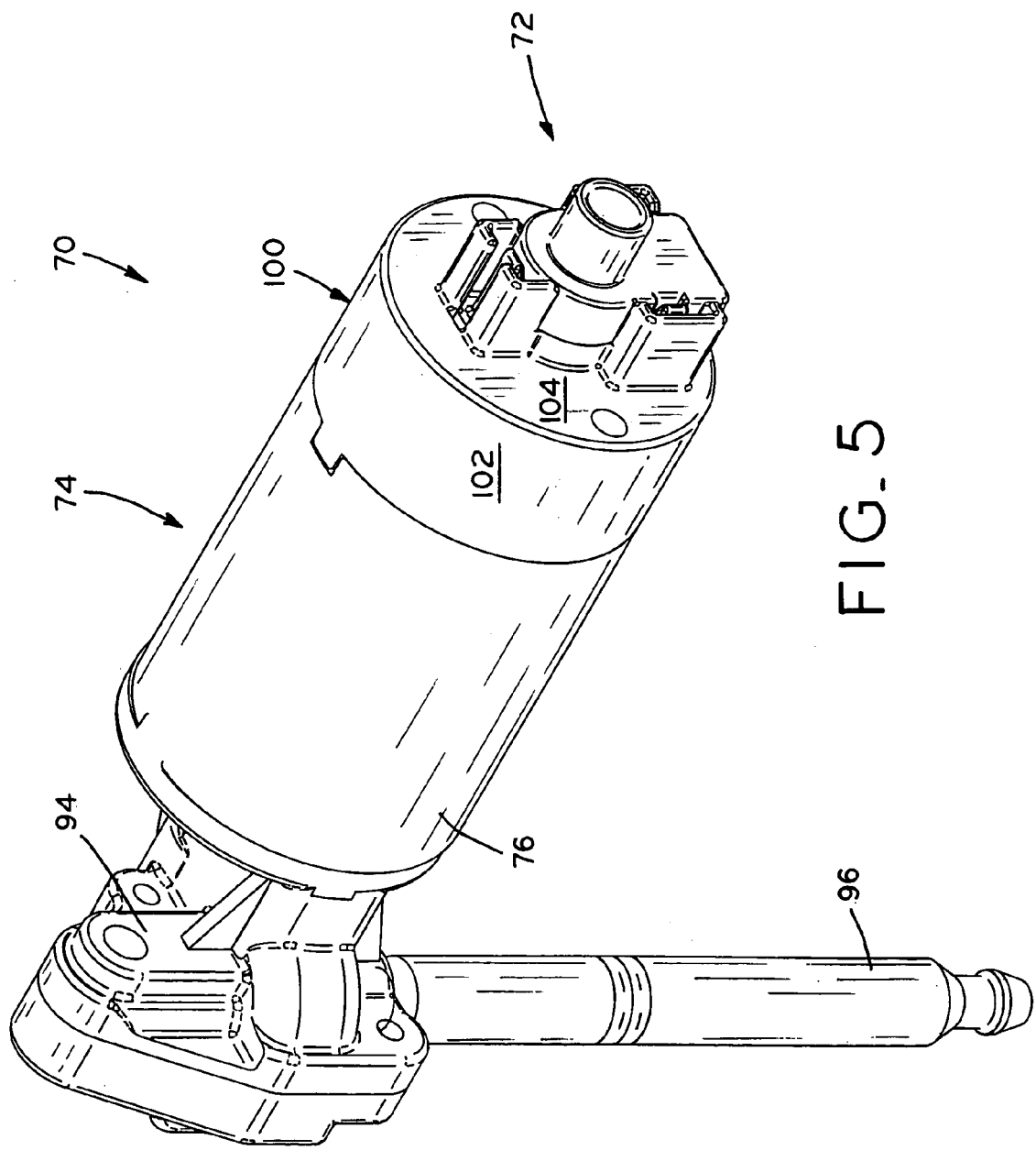
FIG. 5 is a perspective view of a motor assembly with a Hall effect module according to the present invention.

Second armature end portion 88 is rotatably supported by bearing 92 within motor housing 76, and is drivingly connected to an input shaft (not shown) of gear box 94. Referring to FIG. 5, gear box 94 includes threaded shaft 96 extending therefrom, which is driven by motor 74 through gear box 94. In an exemplary application, threaded shaft 96 may be coupled in a suitable manner to the adjustment structure of an automobile seat (not shown) to raise or lower the seat.

Figure 6:
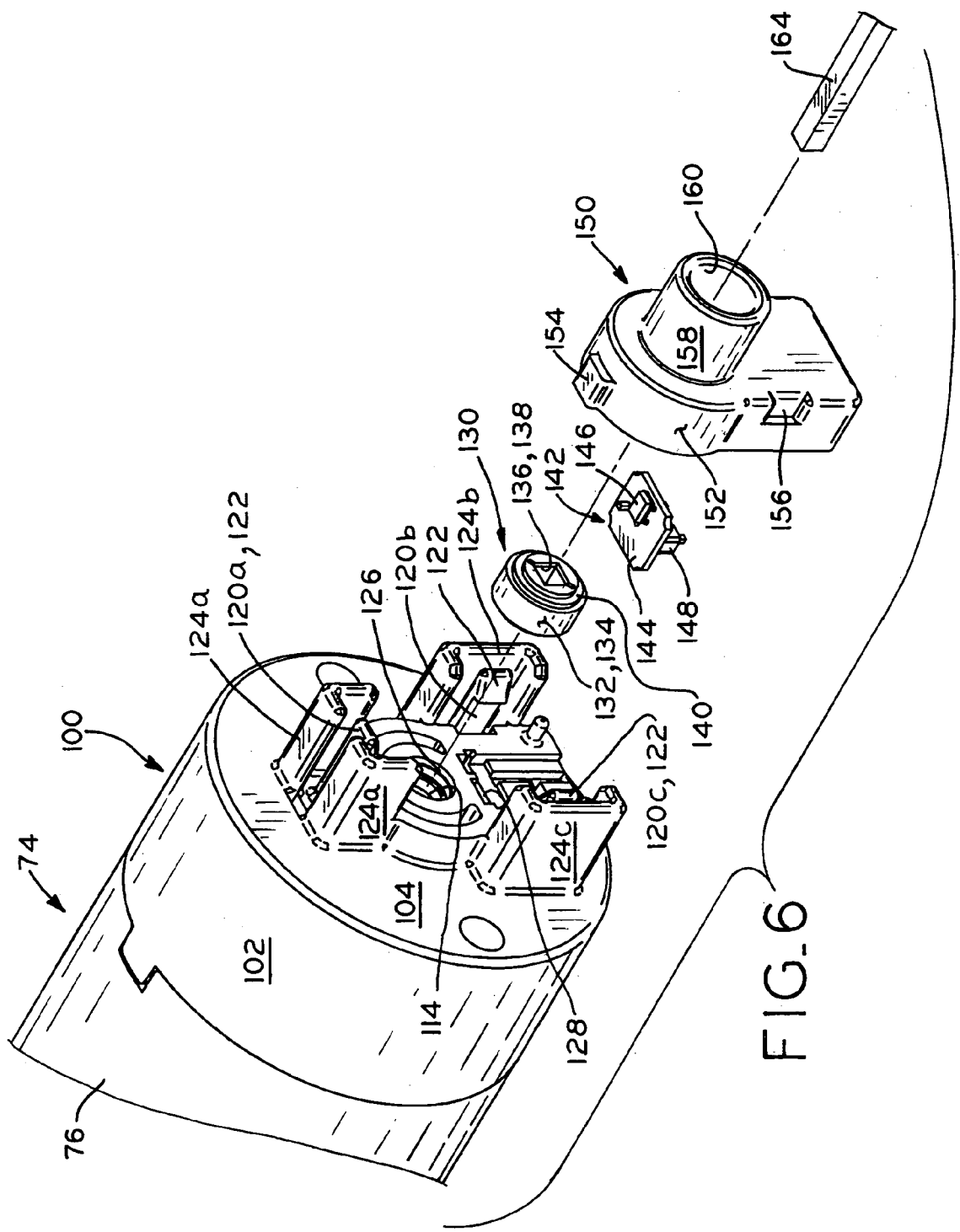
FIG. 6 is an exploded view of the Hall effect module of the motor assembly of FIG. 4, showing the endframe, magnet assembly, PCB assembly, and cover.

Referring to FIGS. 6 and 8, motor 74 includes endframe 100 having cylindrical body portion 102, end face 104, and circular opening 114 therein. Endframe 100 is preferably made from a rigid plastic material, such as polypropylene. Endframe 100 is attached to motor housing 76 by securing body portion 102 of endframe 100 to motor housing 76 by welding, crimping, or by suitable fasteners. Referring to FIG. 8, before endframe 100 is attached to motor housing 76, brush holder assembly 106 is attached to endframe 100 by inserting a plurality of integral tabs 108 extending from endframe 100 into apertures 110 of brush holder assembly 106. Brush holder assembly 106 includes brushes 112 through which power is input into the commutator of motor 74 to thereby power motor 74 in a conventional manner. When endframe 100 is attached to motor housing 76, bearing 116 is captured between first end portion 84 of armature 82 and bearing sleeve 118 of endframe 100 to rotatably support first end portion 84 of armature 82.

Figure 7:
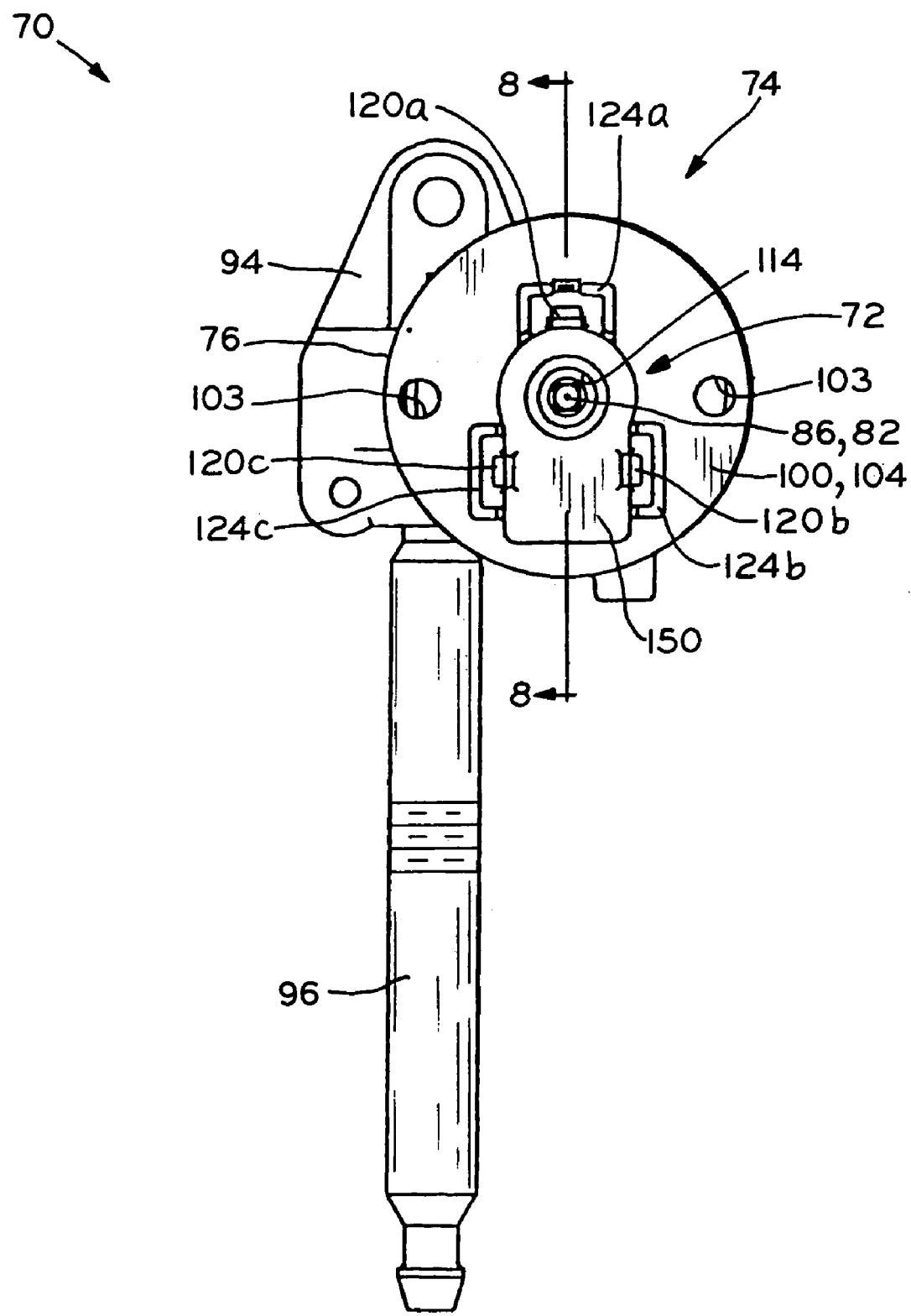
FIG. 7 is an end view of the motor assembly and Hall effect module of FIG. 5.

Referring to FIGS. 6 and 7, endframe 100 includes three fingers 120a–c, which are integrally formed with endframe 100 and extend outwardly from end face 104. Fingers 120a–c are each substantially rigid, yet may flex with respect to endframe 100 as described below. Fingers 120a–c each terminate in tabs 122. Three rigid walls 124a–c are also integrally formed with endframe 100, and extend outwardly from end face 102. Walls 124a–c are disposed proximate fingers 120a–c, respectively, and at least partially surround fingers 120a–c. Endframe 100 further includes a circular counterbore 126 formed in end face 104 which surrounds circular opening 114. Slot 128 is defined in end face 104 of endframe 100 between fingers 120b and 120c and adjacent circular opening 114.

Magnet/carrier assembly 130 includes magnet 132 having a cylindrical outer surface 134, and carrier portion 136 made of a suitable plastic material and having square hole 138 therethrough. Magnet/carrier assembly 130 is a single piece component formed by insert molding carrier portion 136 within a central hole (not shown) of magnet 132 and around magnet 132. Thus, in Hall effect module 72, the need for a separate magnet and magnet carrier, as in the known Hall effect assembly 30 of FIGS. 1–4, is obviated, such that the number of total parts of Hall effect module 72 is reduced. Carrier portion 136 of magnet/carrier assembly 130 also defines an annular ridge 140 on each side of magnet/carrier assembly 130. An electronic sensor, such as printed circuit board ("PCB") assembly 142, generally includes body portion 144 with Hall effect pickup 146 on one side, and electrical connector 148 on its opposite side.

Cover 150 includes outer surface 152 defining lug 154 as well as a pair of recesses 156 in opposite sides of cover 150, though the particular arrangement of lugs 154 and recesses 156 may vary. Cover 150 additionally includes boss 158 extending therefrom defining an opening 160 which, when cover 150 is attached to endframe 100 as described below, is axially aligned with hole 138 of magnet/carrier assembly 130, circular opening 114 of endframe 100, and hole 86 in first end portion 84 of armature 82.

To assemble Hall effect module 72, endframe 100 is first attached to motor housing 76 as described above. Thereafter, magnet/carrier assembly 130 is aligned with circular opening 114 of endframe 100, with annular ridge 140 of magnet/carrier assembly 130 positioned within counterbore 126 of endframe 100 to aid in the correct positioning of magnet/carrier assembly 130 with respect to circular opening 114 of endframe 100. PCB assembly 142 is attached to endframe 100 by inserting body portion 144 of PCB assembly 142 into slot 128 of endframe 100, such that pickup 146 of PCB assembly is disposed closely adjacent outer surface 134 of magnet 132 of magnet/carrier assembly 130.

Thereafter, cover 150 is positioned or located within walls 124a–c of endframe 100, with walls 124a–c contacting outer surface 152 of cover 150. Cover 150 is then pressed toward end face 104 of endframe 100, with walls 124a–c guiding cover 150 therebetween, to engage fingers 120a–c of endframe 100 with lug 154 and recesses 156 of cover 150. Specifically, tab 122 of finger 120a engages behind lug 154, tab 122 of finger 120b engages within a recess 156 on a first side of cover 150, and tab 122 of finger 120c engages within a recess 156 on an opposite side of cover 150 in snap-fit connections to rigidly secure cover 150 to endframe 100. Alternatively, the configuration of the foregoing connecting structure may be modified, for example, cover 150 may include fingers 120a–c and/or walls 124a–c, and endframe 100 may include lugs 154 and/or recesses 156.

When cover 150 is attached to endframe 100, magnet/carrier assembly 130 and PCB assembly 142 are snugly captured between endframe 100 and cover 150 to fix the positions of magnet/carrier assembly 130. Additionally, when cover 150 is attached to endframe 100, opening 160 of cover 150, hole 138 of magnet/carrier assembly 130, circular hole 114 of endframe 100, and hole 86 in first end portion 84 of armature 82 are all axially aligned.

Advantageously, walls 124a–c guide cover 150 as same is attached to endframe 100, and also substantially surround fingers 120a–c such that fingers 120 are protected from external contact which might otherwise disengage fingers 120 from cover 150. Further, the abutting contact between walls 124a–c and outer surface 152 of cover 150 prevents movement of cover 150 with respect to endframe 100 or disengagement of cover 150 from endframe 100 if cover 150 is externally contacted.

In subsequent assembly operations, a drive pin 164 or end portion of a flexible cable (a portion of which is shown in FIG. 6) may be inserted through opening 160 of cover 150, hole 138 of magnet/carrier assembly 130, circular hole 114 of endframe 100, and into hole 86 in first end portion 84 of armature 82 to drivingly couple the drive pin 164 or flexible cable end to motor 74. An electrical connector (not shown) may be inserted into receptacle 162 (FIG. 8) defined between cover 150 and endframe 100 and into engagement with PCB assembly 142.

During operation of motor 74, magnet 132 is rotated with the drive pin 164 or flexible cable, and PCB assembly 142 receives an input voltage from a suitable source. Pickup 146 of PCB assembly 142 registers each rotation of magnet 132 according to well-known Hall effect principles and generates an output voltage in square wave form which is indicative of the position of armature 82 of motor 74. In the exemplary application of an automobile power seat, the position of armature 82 may be input into a suitable memory control to enable a seat memory feature, in which a desired adjusted position of the seat is programmed into the memory control, such that the seat may be automatically moved from a non-adjusted position to a preset, desired adjusted position.

Alternatively, if motor assembly 70 is used in an application in which Hall effect sensing hardware is not needed, motor assembly 70 is assembled without magnet/carrier assembly 130 and PCB assembly 142 by attaching cover 150 to endframe 100 in a one-step operation in the manner described above. In this manner, Hall effect memory module 72 is modular in configuration, permitting same to be assembled either with or without magnet/carrier assembly 130 and PCB assembly 142, depending upon whether a Hall effect sensing feature is desired for motor assembly 70.

If access to magnet/carrier assembly 130 or PCB assembly 142 is desired for repair or replacement, for example, the end of a suitable tool such as a screwdriver may be inserted between each flexible finger 120a–c and its corresponding lug 154 or recesses 156 to thereby disengage cover 150 from endframe 100. After repairing or replacing magnet/carrier assembly 130 or PCB assembly 142, cover 150 may be re-attached to endframe 100 as described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electric motor, comprising:
   a motor housing containing a stator, rotor, and armature assembly;
   an endframe attached to an open end of said motor housing, said endframe including an opening aligned with said armature, a plurality of resilient fingers extending from said endframe, and a plurality of walls extending from said endframe, each said wall at least partially surrounding a respective said finger;
   a cover attached to said endframe, said cover including engagement structure engaged by said resilient fingers, said endframe and said cover defining a cavity therebetween;
   a magnet and a Hall effect sensor each disposed within said cavity, said magnet aligned with said endframe opening, and said Hall effect sensor disposed proximate said magnet.

2. The motor of claim 1, wherein said armature includes a hole in an end thereof, and each of said endframe, magnet, and cover include openings axially aligned with said armature hole.

3. The motor of claim 2, further comprising a drive component disposed within said armature hole, said drive component extending through said openings in said endframe, magnet, and cover.

4. The motor of claim 3, wherein said drive component is keyed to said magnet opening.

5. The motor of claim 1, wherein said engagement structure comprises at least one of a lug and a recess.

6. The motor of claim 1, wherein said armature assembly is drivingly connected to a gear box.

7. The motor of claim 1, wherein said resilient fingers are integrally formed with said endframe.

8. The motor of claim 1, wherein said resilient fingers comprise securement tabs, said engagement structure engaged by said securement tabs.

9. The motor of claim 1, further comprising a carrier assembly including said magnet integrally formed therewith.

10. The motor of claim 1, wherein said walls and said cover are in abutting engagement.

11. The motor of claim 1, wherein said plurality of resilient fingers comprise at least three flexible fingers extending outwardly from said endframe.

* * * * *